United States Patent [19]

Bradshaw

[11] 4,264,633

[45] Apr. 28, 1981

[54] REASSEMBLED MEAT PRODUCT

[75] Inventor: Noel-James Bradshaw, Sharnbrook, England

[73] Assignee: Thomas J. Lipton, Inc., Englewood Cliffs, N.J.

[21] Appl. No.: 66,993

[22] Filed: Aug. 16, 1979

Related U.S. Application Data

[63] Continuation-in-part of Ser. No. 878,764, Feb. 17, 1978, abandoned.

[30] Foreign Application Priority Data

Feb. 23, 1977 [GB] United Kingdom ............... 7613/77

[51] Int. Cl.³ .............................................. A23L 1/31
[52] U.S. Cl. .................................. 426/264; 426/641; 426/513
[58] Field of Search ............. 426/266, 272, 274, 513, 426/654

[56] References Cited

U.S. PATENT DOCUMENTS

| | | | |
|---|---|---|---|
| 3,075,843 | 1/1963 | Maas | 426/272 |
| 3,076,713 | 2/1963 | Maas | 426/272 |
| 3,238,046 | 3/1966 | Komarik | 426/272 |
| 3,547,656 | 12/1970 | Schlamb | 426/644 |
| 3,679,434 | 7/1972 | Bard et al. | 426/272 |
| 3,689,284 | 9/1972 | Nash et al. | 426/272 |
| 3,898,345 | 8/1975 | Horrocks et al. | 426/272 |

Primary Examiner—Robert A. Yoncoskie
Attorney, Agent, or Firm—Brumbaugh, Graves, Donohue & Raymond

[57] ABSTRACT

A process for binding pieces of cooked meat together to produce a unitary product by impregnating pieces of uncooked meat with an aqueous solution containing a source of phosphate ions, cooking the meat, coating the cooked meat with an edible, heat-settable, thermostable glue containing an emulsifier selected from the group consisting of mono-diglycerides derived from stearic acid and sodium stearoyl-2-lactylate, compacting the coated pieces of meat and heating the compacted pieces of meat to obtain a product which on reheating remains cohesive.

13 Claims, No Drawings

REASSEMBLED MEAT PRODUCT

This is a continuation-in-part application of application Ser. No. 878,764, 2-17-78, now abandoned.

This invention relates to a process for binding pieces of cooked meat together to produce an integral body of meat which does not come apart on reheating and which on slicing has a texture similar to a primal cut of meat.

Several methods have been proposed for achieving this result. One of the methods involves curing uncooked meat with a curing composition containing phosphate ions and mechanically working the uncooked meat until an appreciable amount of a tacky exudate forms on the surfaces. The tacky surfaces are pressed together and the meat is cooked to form a compact body.

This method, although reasonably suitable for binding pieces of pork hams, is less satisfactory when used to bind small joints of beef together in an integral body.

According to another method, small joints of meat are cooked, bound together and shaped in one operation. A disadvantage associated with this method is that cooking losses are high and the liquors which are released during cooking interfere with the binding process. This results in poor binding between the pieces of meat. Gelatin is frequently used to bind the pieces of meat together, but is unsuitable for use in meat products which are reheated by the housewife. Gelatin is not a thermostable, heat-settable material and meat products which are bound with gelatin fall apart when reheated.

I have found a process which overcomes the disadvantages of the traditional processes discussed above. The process according to the invention comprises:

(a) impregnating pieces of meat with a curing composition which contains a source of phosphate ions;

(b) cooking the pieces of meat to set the meat protein;

(c) coating the cooked pieces of meat with an edible thermostable heat-settable glue emulsion comprising finely divided meat and water in a proportion of 1 part by weight of meat to 0.01–1 parts by weight of water and 0.1 to 5% by weight of an emulsifier selected from the group consisting of mono-diglycerides derived from stearic acid and sodium stearoyl-2-lactylate;

(d) compacting the coated pieces of meat; and (e) heating the compacted pieces of meat to ensure a temperature ranging from 60° C. to 130° C. at the center of the meat.

In the process according to the invention, the term meat includes any kind of meat such as beef, pork, lamb and poultry. Preferably pieces of low-priced meat are used.

The pieces of meat can be relatively large and weigh from 100 grams to 1,000 grams or they can be relatively small, for example in the form of dice or flakes.

The curing composition is preferably an aqueous composition which contains a salt comprising a source of phosphate ions such as an alkali metal tripolyphosphate, pyrophosphate, hexametaphosphate or a mixture thereof. A mixture of sodium chloride and sodium tripolyphosphate constitutes a suitable curing composition.

Aqueous solutions containing 1–6% of, for example, sodium polyphosphate and 1–6% of sodium chloride are also useful in the present invention The pieces of meat are impregnated with the curing compositions by, for example, injecting an aqueous solution of the curing composition into pieces of meat and then tumbling the pieces of meat. If the pieces of meat are too small to be injected with the curing composition, they can be soaked in an aqueous solution of the curing composition for about 2–20 hours.

The pieces of meat impregnated with the curing composition are cooked to achieve a center temperature in the range of 60° to 130° C. in order to set the meat protein. The cooking operation can be carried out in an aqueous medium, in hot air or in steam. Before coating the cooked pieces of meat with the edible glue, it is sometimes useful to allow them to cool to a temperature below the heat-setting temperature of the glue. In the case where the glue sets slowly, the cooling step can be omitted.

The term "glue" as used herein means a substance which is used to bind together the pieces of meat. A heat-settable, thermostable glue means a glue which sets on heating and remains stable and solid on reheating. The glue can consist of a thermostable heat-settable protein of animal or vegetable origin, such as an emulsion of meat, blood albumin, egg albumin and/or soy protein. The glue also contains finely comminuted meat such as bowl-chopped meat, or an emulsion of meat and water in a proportion of 1 part of meat to 0.01–1 parts of water, which contains an emulsifier or a mixture of emulsifiers. These emulsifiers are particularly useful when binding together joints of meat with a relatively high fat content, for example a fat level above 10% as in meat originating from, for example, the shoulder of a mutton or lamb. The emulsifiers are selected from the group consisting of monodiglycerides derived from stearic acid and sodium stearoyl-2-lactylate. Monodiglycerides useful in this invention include commercially available unrefined mixtures of glycerides.

It is believed that these emulsifiers affect the surface of the pieces of meat in a way which allows them to bind together more effectively to form a unified piece of meat. Other emulsifiers including lecithin, bile salts and Tween 80 did not have the same binding effect as the specific emulsifiers used in this process.

The glue may also contain other additives. The function of the additives is to improved the strength of the glue, its binding capacity or its adhesion to the surfaces of the meat joints or pieces. Other useful additives are the salts used in the curing step. These are used at a level of 1 to 6% based on the weight of the glue composition. Additional useful additives are animal and vegetable proteins such as blood albumin, egg albumin and/or soy protein. These proteins are used preferably at a level of 1–6% based on the total weight of the glue composition.

Another class of additives consists of starchy materials, preferably uncooked starches, such as potato starch, maize starch and the like. The starches act as water-absorbing agents which will bind any water which may be liberated during the heat-setting stage of the process and which would otherwise interfere with the binding process. The starchy material can be incorporated at a level of 1–10% based on the total weight of the glue formulation.

It will be understood that combinations of the above-mentioned additives can be incorporated in the formulation of the glue. For example, a mixture of uncooked starch, curing salts and emulsifiers is useful.

Prior to heating the glue-coated, cooked pieces of meat, it is important to compact the bound pieces tightly. For example, the pieces can be stuffed into casings or molds which preferably have the entrapped air removed by applying a vacuum to the casing.

The casings or molds are subsequently heated in air or in water at a suitable temperature and time to ensure heat-setting of the glue.

When a meat and water emulsion is used, the casings or molds are heated to a center temperature between 60°-130° C., preferably between 70° and 100° C.

The product obtained from this process is then cooled and can be easily sliced and packaged.

The advantages of the process of this invention can be summarized as follows:

(1) The cooking losses are considerably reduced by the treatment with the curing composition;

(2) Since the joints of meat are cooked before being coated with the glue, the heat-setting step can be carried out very quickly. This means that the pieces are heated only long enough to set the thin coating of glue, and as a result there is little or no interference with the binding process by further losses of cooking liquors;

(3) On reheating the integral meat product, for example in the form of meat slices in gravy, remains coherent and does not break apart;

(4) The original texture of the meat is retained; and (5) The meat does not wrinkle up when reheated.

The invention can be illustrated but is not limited by the following Examples.

EXAMPLE 1

Preparation of a unitary product from chicken meat 5 kg of uncooked, boneless chicken meat was soaked overnight in a solution containing 2% sodium chloride and 1% polyphosphate. The excess liquid was drained off and the chicken meat was cooked in a vat of water at 95° C. for 45 min.

The edible "glue" was made by mincing raw chicken meat and adding salt, polyphosphate, mono-diglyceride and uncooked farina (potato starch). The composition of the "glue" was:

| Ingredient | wt. % |
|---|---|
| Minced chicken meat | 89 |
| Uncooked farina (potato starch) | 8.5 |
| Sodium chloride | 1 |
| Sodium polyphosphate (commercially available polyphosphate mixture) | 0.5 |
| Mono-diglyceride emulsifier (unrefined mixture mainly consisting of a monoglyceride derived from stearic acid) | 1 |

1½ kg cooked chicken meat were mixed with 250 g of "glue" and compressed into a fibrous casing. The casings of meat were heated to a center temperature of 80° C. in order to set the "glue" and to form logs of meat. The logs of meat were chilled to 5° C., removed from the casings and sliced to a thickness of 3 mm. The slices of meat remained cohesive.

EXAMPLE 2

Preparation of unitary product from mutton

Boneless mutton shoulder meat (pieces of 800 grams) was injected with a solution containing 5% salt and 2.5% polyphosphate in water to give a pick-up yield of 20%. The meat was tumbled for 10 minutes and then cooked in a water vat at 95° C. until a meat center temperature of 80° C. was reached.

A "glue" was prepared consisting of:

| Ingredient | wt. % |
|---|---|
| Raw, finely minced lean mutton | 66 |
| Sodium chloride | 1.25 |
| Sodium polyphosphate (commercially available polyphosphate mixture) | 0.75 |
| Sodium stearoyl-2-lactylate | 1 |
| Water | 31 |

15% by weight of the above "glue" was added to the cooked meat. The meat and "glue" were gently mixed to ensure that the surface of the meat was coated with "glue". The mixture was compressed into a fibrous casing and reheated in boiling water to allow the meat center to reach a temperature of 80° C. The solid log of meat was chilled to 5° C. before slicing. The slices of meat remained cohesive during slicing and did not fall apart when reheated in gravy.

EXAMPLE 3

The procedure of Example 2 was followed except that pork was used instead of mutton. The slices remained cohesive during slicing and heating in gravy.

I claim:

1. A process for binding pieces of cooked meat into an integral meat product which comprises:
   (a) impregnating pieces of meat with a curing composition which contains a source of phosphate ions;
   (b) cooking the pieces of meat to set the meat protein;
   (c) coating the cooked pieces of meat with an edible thermostable heat-settable glue emulsion comprising finely divided meat and water in a proportion of 1 part by weight of meat to 0.01-1 parts by weight of water and 0.1 to 5% by weight of an emulsifier selected from the group consisting of mono-diglycerides derived from stearic acid and sodium stearoyl-2-lactylate;
   (d) compacting the coated pieces of meat; and
   (e) heating the compacted pieces of meat to ensure a temperature ranging from 60° C. to 130° C. at the center of the meat.

2. A process according to claim 1, wherein beef is used.

3. A process according to claim 1, wherein the curing composition contains a material selected from the group consisting of an alkali metal tripolyphosphate, pyrophosphate, hexametaphosphate and an alkali metal chloride or mixtures thereof.

4. A process according to claim 3, wherein sodium chloride and sodium tripolyphosphate are each used in a concentration ranging from 1-6%.

5. A process according to claim 1, wherein the pieces of meat are impregnated with the curing composition by injecting the curing composition into the pieces of meat.

6. A process according to claim 1, wherein the pieces of meat are impregnated by soaking in the curing composition.

7. A process according to claim 1, wherein the cooking operation in step (b) is carried out to achieve a temperature in the center of the product ranging from 60°-130° C.

8. A process according to claim 1, wherein the glue composition contains about 1% to 6% blood albumin.

9. A process according to claim 1, wherein about 1% to 10% of an uncooked starch is added to the glue composition.

10. A process according to claim 1, wherein about 1% to 10% of an uncooked starch, about 1% to 6% blood albumin and curing salts are added to the glue composition.

11. A process according to claim 1, wherein 2 to 20% of glue based on the weight of the cooked meat is used.

12. A process according to claim 1, wherein the coating operation is carried out after allowing the cooked pieces of meat to cool to a temperature below the heat-setting temperature of the glue composition.

13. A process according to claim 1, wherein the coated pieces of meat are compacted by stuffing them into casings or molds.

* * * * *